US012661650B2

(12) United States Patent
Gershtein et al.

(10) Patent No.: US 12,661,650 B2
(45) Date of Patent: Jun. 23, 2026

(54) PBMC SEPARATION SYSTEMS AND METHODS OF USE

(71) Applicant: Aridica Corporation, Boulder, CO (US)

(72) Inventors: Sergey Gershtein, Skillman, NJ (US); Charles Robertson, Summit, NJ (US); Chockalingam Palaniappan, Highlands Ranch, CO (US)

(73) Assignee: Aridica Corporation, Boulder, CO (US)

( * ) Notice: Subject to any disclaimer, the term of this patent is extended or adjusted under 35 U.S.C. 154(b) by 0 days.

(21) Appl. No.: 19/064,235

(22) Filed: Feb. 26, 2025

(65) Prior Publication Data

US 2025/0269373 A1 Aug. 28, 2025

Related U.S. Application Data

(60) Provisional application No. 63/558,148, filed on Feb. 27, 2024.

(51) Int. Cl.
*B01L 3/00* (2006.01)
*B04B 5/04* (2006.01)
*B04B 13/00* (2006.01)

(52) U.S. Cl.
CPC ...... *B01L 3/502753* (2013.01); *B04B 5/0442* (2013.01); *B04B 13/00* (2013.01); *B01L 2300/0864* (2013.01); *B01L 2300/087* (2013.01); *B01L 2300/161* (2013.01); *B01L 2400/0409* (2013.01); *B01L 2400/0605* (2013.01)

(58) Field of Classification Search
None
See application file for complete search history.

(56) References Cited

U.S. PATENT DOCUMENTS

| | | | | |
|---|---|---|---|---|
| 8,210,209 | B2 * | 7/2012 | Gilbert ................ | F16K 99/0048 137/829 |
| 9,186,668 | B1 * | 11/2015 | Schaff .............. | G01N 33/56972 |
| 9,421,541 | B2 | 8/2016 | Moon et al. | |
| 10,188,784 | B2 | 1/2019 | Katz et al. | |

(Continued)

OTHER PUBLICATIONS

KR 20210138640 A, Nov. 19, 2021, English translation included. (Year: 2021).*

(Continued)

*Primary Examiner* — Lore R Jarrett
(74) *Attorney, Agent, or Firm* — Double Helix Law; Emanuel Vacchiano

(57) ABSTRACT

The invention provides cartridges, systems and methods for the separation of a PBMC fraction from a blood sample. The cartridge comprises a valve which is configured to be actuated by physical or magnetic force. The system comprises a rotor for rotating a cartridge and an actuator to operate a valve. A sensor may be provided in the system to provide feedback on the separation of the sample in the cartridge. The method provides for loading a blood sample into a cartridge, rotating the cartridge, and opening or closing a valve on the cartridge. The disclosed cartridges, systems and methods may be used together; however, it is also envisioned that the systems and methods may utilize other cartridges and/or other systems.

20 Claims, 7 Drawing Sheets

(56) References Cited

U.S. PATENT DOCUMENTS

| | | | |
|---|---|---|---|
| 10,413,652 B2 | 9/2019 | Foley et al. | |
| 10,697,447 B2 | 6/2020 | Wegener et al. | |
| 10,865,805 B2 | 12/2020 | Wegener et al. | |
| 10,981,174 B1 * | 4/2021 | Koh | B01L 7/525 |
| 11,013,850 B2 | 5/2021 | Gibbs et al. | |
| 11,090,397 B2 | 8/2021 | Min | |
| 11,103,630 B2 | 8/2021 | Holmes et al. | |
| 11,478,755 B2 | 10/2022 | Wegener et al. | |
| 11,478,792 B2 | 10/2022 | Ladtkow et al. | |
| 11,623,034 B2 | 4/2023 | Abedin et al. | |
| 11,738,288 B2 | 8/2023 | Chammas | |
| 11,745,178 B2 | 9/2023 | Wegener | |
| 11,773,365 B2 | 10/2023 | O'Connor et al. | |
| 11,781,113 B2 | 10/2023 | Shi et al. | |
| 2007/0178529 A1 | 8/2007 | Breidford et al. | |
| 2011/0085950 A1 | 4/2011 | Lee et al. | |
| 2017/0176306 A1 | 6/2017 | Boehm et al. | |
| 2017/0354362 A1 | 12/2017 | Xu et al. | |
| 2018/0093270 A1 * | 4/2018 | Ladtkow | A61M 1/3693 |
| 2018/0104694 A1 * | 4/2018 | Huff | G01N 33/5302 |
| 2018/0264471 A1 | 9/2018 | Boehm et al. | |
| 2018/0304002 A1 * | 10/2018 | Holmes | A61M 1/3693 |
| 2020/0030795 A1 * | 1/2020 | Pais | B01L 3/502715 |
| 2020/0391209 A1 * | 12/2020 | Schenk zu Schweinsberg | B01L 3/502715 |
| 2021/0086173 A1 * | 3/2021 | Samsoondar | B01L 3/502 |
| 2021/0156842 A1 * | 5/2021 | Schaff | G01N 33/491 |
| 2021/0178392 A1 * | 6/2021 | Pais | B01L 3/502715 |

OTHER PUBLICATIONS

Park, Jet al. "Fully automated circulating tumor cell isolation platform with large-volume capacity based on lab-on-a-disc." Analytical chemistry 86.8 (Apr. 15, 2014): 3735-3742.

Al-Faqheri et al., "Development of novel passive check valves for the microfluidic CD platform", Sensors and Actuators A: Physical ,vol. 222, Feb. 1, 2015, pp. 245-254, doi.org/10.1016/j.sna.2014.12.018.

Grover et al., "Monolithic membrane valves and diaphragm pumps for practical large-scale integration into glass microfluidic devices", Sensors and Actuators B: Chemical vol. 89, Issue 3, Apr. 1, 2003, pp. 315-323, doi. org/10.1016/S0925-4005(02)00468-9.

Kong et al., "Lab-on-a-CD: A Fully Integrated Molecular Diagnostic System", Journal of Laboratory Automation, vol. 21, Issue 3, Jun. 16, 2015, doi.org/10.1177/2211068215588456.

Peshin et al., "Microvalves for Applications in Centrifugal Microfluidics", Sensors 2022, vol. 22, 8955, Nov. 18, 2022, 36 pages, doi.org/10.3390/s22228955.

* cited by examiner

PBMC SEPARATION SYSTEMS AND METHODS OF USE

CROSS-REFERENCE TO RELATED APPLICATIONS

This application claims priority to U.S. Provisional Application Ser. No. 63/558,148, filed on Feb. 27, 2024, which is incorporated herein by reference in its entirety.

TECHNICAL FIELD

The disclosure relates to systems and methods for the separation of peripheral blood mononuclear cells (PBMCs) from blood samples.

BACKGROUND

In many different fields, fluids carrying particle substances must be filtered or processed to obtain either a purified liquid or a purified particle end product. As a result, a number of fluid separation devices and related techniques have been developed and are currently employed across a broad spectrum of applications.

In the medical field, it is often necessary to filter or separate blood. Whole blood consists of both liquid components and particle components. The liquid portion of blood is largely made up of plasma. The particle components of blood, which may be referred to as "formed elements," include red blood cells (erythrocytes), white blood cells (including leukocytes) and platelets (thrombocytes). Although individual particle constituents may have similar densities, the groups of formed elements generally follow an average density relationship which, in order of decreasing density, is red blood cells, white blood cells and platelets. Plasma is less dense than the blood platelets.

Likewise, the particle constituents of blood can be classified according to relative size. In particular, particle constituents generally decrease in size from white blood cells to red blood cells to platelets. These size and density relationships are important insofar as most current separation devices and techniques rely upon them in order to effectively and reliably separate and/or filter the blood components. Additional techniques rely on differences in particle surface chemistry characteristics.

Of particular interest in whole blood separation is the ability to obtain purified peripheral blood mononuclear cells (PBMCs). PBMCs are peripheral blood cells characterized by a single nucleus, and which form an essential component of the human immune system. PBMCs are a component of white blood cells and are utilized in research and clinical applications across an array of fields including, but not limited to, immunology, infectious diseases, hematology, vaccine development, tissue transplant, and high-throughput screening. PBMCs include monocytes, lymphocytes and macrophages. Lymphocytes consist of T cells, B cells and natural killer (NK) cells, each playing a crucial role in the body's natural defenses. In order to study and analyze PMBCs, clinicians and researchers first require an effective separation of PBMCs from whole blood. The efficacy of this isolation is critical in obtaining reliable and accurate results in subsequent phases of study and analysis.

Most commonly, blood components are separated or harvested from other blood components using a density gradient centrifugation method. Diluted blood is overlayed in a tube onto density gradient media in the sample preparation step. A commonly used, commercially available density gradient media is Ficoll®. During separation, a centrifuge rotates the sample tube to separate components within the tube into layers utilizing centrifugal force with assistance of density gradient media. The centrifugal force stratifies the blood components and density gradient media ensures the PBMCs are separated into its own layer by density. Consequently, particular components may be separately removed. Typically, the extraction of components is performed by hand with a syringe, pipette, or similar implement used to aspirate the desired component without perturbing the other ones. Even when performed by a skilled technician, substantial variability is introduced between samples depending on the accuracy and proficiency of the technician. After centrifugation and extraction of desired PBMC layer, the resulting aspirate needs to be mixed with wash media (typically phosphate buffer) and centrifuged again to purify the PBMCs. This process is repeated two or more times to get PBMCs of desired purity.

Additionally, while centrifuges are effective at separating whole blood into plasma, white blood cells (WBC) and red blood cells (RBC), centrifugation is not as effective to separate platelets from WBC in the same step. As a result, the gentle centrifugation process may need to be repeated at different rotational speed several times to obtain a WBC layer free of platelets.

Conventional procedures for separating PMBC are labor and time intensive, highly variable, requiring highly qualified personnel with considerable technical expertise. Current separation procedures also requires large number of disposable medical grade plastic components to facilitate single sample separation. All these plastic disposable components must be sterilized prior to use, which increases their environmental impact. It is thus desirable to reduce variability in PBMC, the time and labor required by the operator to complete an entire collection procedure, as well as to reduce the complexity of the procedures in order to increase productivity, reduce the need for highly skilled labor, lower the potential for operator error and reduce amount of plastic waste.

SUMMARY

The invention provides systems and methods for separation of blood components, including neutrophils, lymphocytes, immune cells, platelets, plasma, and peripheral blood mononuclear cells (PBMCs). One aspect of the invention comprises a cartridge for separation of blood components by rotational force. In preferred embodiment, the invention comprises a system for isolation of a PBMC fraction. In addition, the invention is useful for separation of plasma, neutrophils, lymphocytes, immune cells, and platelets.

According to one aspect of the disclosure, a fluidic cartridge for separation of blood components by rotational force is provided. The cartridge comprises an inlet region, a separation region, a collection region, a plurality of channels connecting the regions, and a valve in association with the plurality of channels. In some embodiments, the valve is configured to be actuated by physical or magnetic force, and preferably is not a wax valve. Wax valves require a high temperature (up to 70 C.) for activation, introduce additional foreign materials and contaminants in separated blood components and wax valves are not reversible. In additional embodiments, the cartridge is a single-use cartridge. In some embodiments, the channels of the fluidic cartridge are coated with a hydrophilic coating to facilitate consistent and uniform filling. In some embodiment additional capillary stops are implemented in the channels to control fluid propagation prior, during, and after rotation. In some embodiments additional hydrophobic/hydrophilic coatings are employed on parts or complete channels or reservoirs to help control propagation of fluids prior or during rotation. A cartridge according to the invention can be microfluidic or macrofluidic.

According to another aspect of the disclosure, a PBMC separation system is provided. The system comprises a rotor to hold and rotate one or more cartridge containing a blood sample, an actuator to operate one or more valve on the cartridge, one or more sensor to monitor the cartridge, and a controller that controls operation of the rotor and valves to isolate a separated portion of PBMCs. In some embodiments, the invention comprises of a data entry subsystem that may be a barcode reader, near field or RF communication tag for tracking cartridges. In those instances, this tag is useful for sample tracking, patient or operator tracking, as well as specifics of the sample components.

According to yet another aspect of the disclosure, methods comprise loading a blood sample into a cartridge, either inside or outside of the system, loading cartridge in the centrifuge, applying centrifugal force to the blood sample by rotating the cartridge, and opening or closing one or more valve of the cartridge by applying physical or magnetic force to the one or more valve during rotation to modify an internal flow path of the cartridge. Systems of the invention may also comprise sensors for automatic processing of the sample and especially for automated valve operation. Data collected at runtime by on-board sensors can be used in some embodiments for runtime uptime optimization of the separation cycle. In another embodiment, the data can be used for further processing as a quality metrics, performance dashboards, or other data analysis methods.

In a preferred embodiment, microprocessors control actuators that open and close valves and are able to operate under high centrifugal forces (typically, 1000G or greater). In addition to the foregoing, the invention contemplates various process improvements, such as optical assessment (e.g., by optical density measurements or fluorescence or luminescence) of PBMC quality.

The inventors have found that the use of the disclosed cartridges, especially in combination with the disclosed systems and methods, removes the need for highly-skilled labor to perform multiple lab manipulations to isolate a separated portion of PBMCs. In contrast, the use of the disclosed cartridges facilitates the separation of PBMCs in less than one hour, often less than 30 minutes. Further, the resulting separated portions of PBMCs are consistently produced at a high quality. The inventors have also found that the use of a disposable cartridge in a benchtop system reduces material costs and generated waste as compared to conventional processes which require multiple separation and wash steps. The inventors have also found that the use of an automated system equipment with sensors and a communication interface enables the collection, archival and processing of data not easily possible with a manual workflow. In some embodiments, collected parameters can include sample identification, type of media, type of buffer solutions, separation cycle parameters, environmental parameters, incoming and outgoing sample characteristics.

Further embodiments of the present disclosure include various devices, systems and methods for separating PBMCs from a blood sample. In some embodiments, the devices, systems and methods of this disclosure may be used to separate cellular components (e.g., PBMCs) from any composite liquid (e.g., whole blood). In some embodiments, the devices, systems and methods of this disclosure may be used to separate other particulate elements from a heterogenous fluid.

DETAILED DESCRIPTION

The principles of the present disclosure are further understood by reference to the following detailed description and the embodiments depicted in the accompanying drawings. It should be understood that, although specific features are shown and described below with respect to detailed embodiments, the present application is not limited to the embodiments described below.

Embodiments below may be described with respect to separating whole blood and blood components; however, such descriptions are merely illustrative, and those of skill in the art will appreciate that the embodiments are not limited to the descriptions herein. The embodiments are intended for use in products, processes, devices, and systems for separating any composite liquid. Accordingly, the present application is not limited to separation of whole blood or blood components.

Additionally, while a preferred embodiment of the disclosure provides for separation of PBMCs from a whole blood sample, the disclosure also contemplates that separation from a fraction of whole blood will simplify and expedite processing. Accordingly, reference is made throughout the disclosure to a blood sample, yet unless specified otherwise, "blood sample" is defined as any sample derived from blood and containing a composite mixture containing PBMCs. Finally, the invention is applicable to isolation of any blood component, including but not limited to neutrophils, lymphocytes, immune cells, platelets, plasma, and peripheral blood mononuclear cells (PBMCs).

Figure 1:
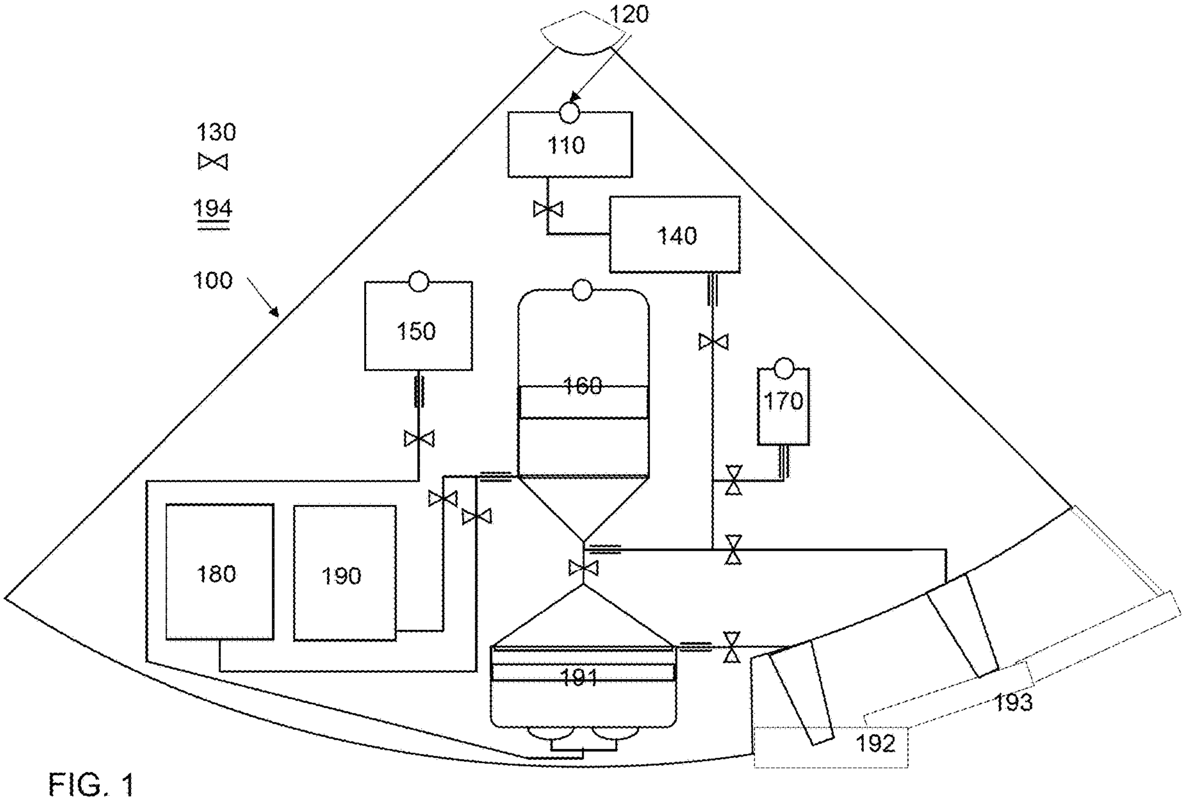
FIG. 1 shows a cartridge of the invention.

FIG. 1 depicts a cartridge according to an embodiment of the present invention. As described elsewhere, the cartridge of the present disclosure is useful for the separation of components of a blood sample by rotational force. While not limited in this regard, FIG. 1 illustrates the cartridge 100. Although FIG. 1 shows a segment of the circle with a set of fluidic components (e.g., reservoirs, channels, valves, etc.) arranged and connected according to current invention, to facilitate separation of the single sample, the implementation may also be a fully circular single cartridge or 2 semicircular cartridges with multiple identical fluidic components groups, allowing for 2 or more samples to be separated simultaneously. That arrangement will either allow for increasing system throughput or separation of a larger volume of the same sample.

As the cartridge will be rotated at high revolution, the circular or segment shape of the cartridge 100 provides better space utilization and stability over other shapes.

The cartridge is described below as containing various components positioned in and between several regions. The lateral location, size of the reservoirs, dimension and location of fluidic channels and valves in combination with hydrophilic or hydrophobic coatings are selected to facilitate fluidic operation of the cartridge utilizing general physical principles, such as Centrifugal, Euler or Coriolis forces eliminating needs for active pumps.

Utilizing passive capillary stop valves it is possible to control propagation of the fluid, utilizing the effect of fluid meniscus pinning for certain hydrophobic surfaces at abrupt channel expansions during periods of no or slow rotation of the rotor. Increasing speed of the rotation will allow centrifugal force to overcome pinning effect.

Utilizing Coriolis forces acting at the rotational speed changes perpendicular to centrifugal force fluids or particles are mixed in the fluidic channel or reservoir or directed into diverging channels.

Centrifugal forces and differences in size and/or density of the sample constituents (plasma, RBC, WBC, platelets) allows cell separation of some or all sample constituents from its heterogeneous mixture.

Zones of hydrophilic and hydrophobic coatings in the channels promote or inhibit fluid propagation by itself or in combination with selected channel size, geometry and rotational speed utilizing physical principal of interaction of intermolecular forces between liquid and surrounding solid surfaces. The speed of reservoir filling or emptying will affect and regulate parts of the separation process.

Positioning reservoirs at different distances from rotational axes, connecting those reservoirs with fluidic channel network and ensuring relative position of entrance and exit ports of those reservoirs, allows control of complete or partial emptying and filling of those reservoirs employing principles of hydrostatic equilibrium.

As shown in FIG. 1, the cartridge 100 comprises several storage reservoirs. Reservoir 160 to store sample prior to and during separation. In one embodiment, parts of the separation process are also executed in storage reservoir 160.

Wash reservoirs 110 and 140 hold wash solution employed during separation. The reservoirs 110 and 140 are connected in series to utilize a single fill port and to open the valves between reservoirs to facilitate convenient filling. Certain other embodiments comprise parallel connection of multiple wash storage reservoirs or a single reservoir with dosing valve to facilitate multiple wash operations during the separation process.

A preferred embodiment also comprises a density gradient media reservoir 150.

Storage media reservoir 170 allows optimization of PBMC storage conditions after separation. The addition of a separate storage media reservoir eliminates manual operation of transferring the PBMC into a different container with storage media.

As shown in FIG. 1, the components are connected to inlet region 120. In preferred embodiment, inlet 120 is directly connected to the reservoir, but it is also contemplated that the inlet 120 may be connected via fluidic channel.

The inlet region is configured to receive a sample fluid. In some cases that fluid is a blood sample. As such, in some embodiments, the inlet region may contain an opening or port adapted to receive a syringe or other implement used to transfer the blood sample to the cartridge. In some embodiments, the blood sample may be transferred to the inlet region through a microchannel by capillary force or pressure differential. In some embodiments, the inlet region may contain an area into which a blood sample is transferred by droplet or other contactless method.

Referring again to FIG. 1, the cartridge 100 further comprises a separation region 191. In some embodiments, the separation region 191 also stores the RBC fraction. In some embodiments, partial or complete separation is performed in the separation region 191. In a preferred embodiment, separation is executed in stages wherein the initial plasma separates from the rest of the components in separation region 191, and parts of the separation process is performed in sample reservoir 160. The separation medium of some embodiments may help separate fractions of the blood sample by density. In some embodiments, the separation region 191 does not contain a separation medium during all or parts of the separation process. In these embodiments, separation of the blood sample may be facilitated solely through separation by centrifugal force where denser cells like RBCs are pulled towards the bottom (outer edge) of the reservoir leaving less dense cell or plasma remaining on top.

The cartridge 100 further comprises a collection region. The collection region is configured to isolate separated portions of sample fraction as well as byproduct of the separation process waste. A preferred embodiment comprises plasma collection reservoir 192, PBMC collection reservoir 193 and waste collection reservoirs 180 and 190. In another embodiment the collection region may comprise one or more reservoir for collecting and isolating partitions of the blood sample and additional byproducts of the separation process. After processing is complete, the PBMCs (or other collected portions) are removed from the cartridge within their respective reservoirs, eliminating the manual process of transferring into containers for further use. In some embodiments, the collection region may be part of the cartridge and comprise connections for microchannels to withdraw the isolated samples for further processing. Accordingly, the collection region may comprise syringe ports or pipette openings for withdrawing isolated samples. In some embodiments, the collection region is further configured to isolate an additional component of the blood sample. The additional component may include one or more of platelets, red blood cells, or polynucleated cells.

A plurality of channels connect the inlet region, the separation region, and the collection region. Certain embodiments of the invention feature a plurality of regions and channels needed for the desired analysis (e.g., outgoing quality and viability control of separated factions).

Figure 6:
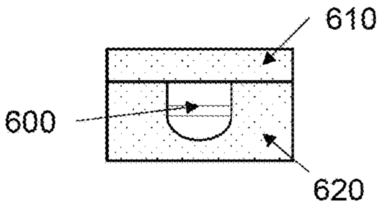
FIG. 6 Show cross section example of the fluidic channel according to the invention FIG. 7A, 7B Shows example of the possible valve implementation FIG. 8. Shows example of alternative valve implementation

FIG. 6 shows a typical cross section of the channel 600. A preferred channel 600 has a semicircle cross sectional profile. Minimizing sharp corners minimizes stagnation areas within the channel 600. Other embodiments comprise rectangular or trapezoid channel profiles to simplify manufacturing. Exact channel dimensions are optimized for specific flow rates.

Channels in the cartridge may include undulations, curves, or other means of lengthening, obstructing or otherwise modifying the flow path along the channel. In some embodiments, the channels include one or more stops to prevent movement of the fluid through the cartridge. In some instances, a stop may be used to prevent flow through a channel of the cartridge in an undesired direction. In other instances, a stop may be used to prevent movement through the cartridge when rotational (also referred to as centrifugal) force is not being applied, for example, before or after processing of the sample. In some embodiments, the channels are coated with heparin or other anticoagulant substance to reduce or eliminate clotting of the blood sample. In some embodiments, channels are coated with a hydrophilic or hydrophobic substance. The inventors have found that it is possible to create regions or zones which promote or inhibit movement relative to other regions or zones by coating or treating one or more of the channels.

As shown in FIG. 1, the cartridge further comprises valves 130.

Figure 7A:
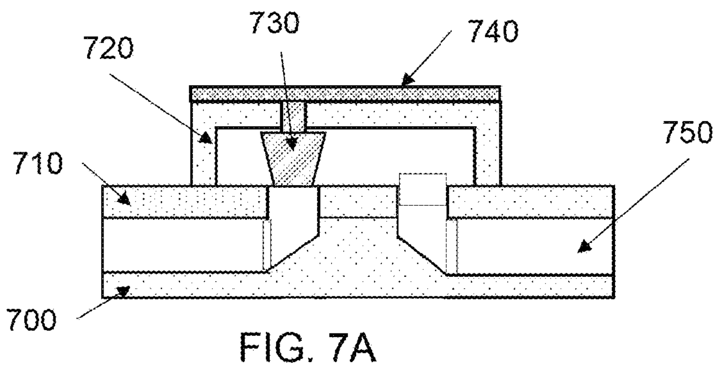

FIG. 7A shows one of the possible embodiments of the valve where channels 750 are molded, machined, embossed, or etched in the bottom portion 700 of the cartridge. The top portion of the cartridge 710 that is adhered to the bottom portion 700 and may have one or more opening. The valve is sealed with valve cover 720. The cover 720 may be welded, bonded, glued to the top portion 710.

In some embodiment, the valve cover 720 is rigid and has an opening for the valve body 730 to protrude through so actuators can interface with valve. In another embodiment the valve cover 720 is a thin portion of the rigid material that allows flexing when force is applied but forms a continuous seal. Valve body 730 can be bonded or be part of the thin flexible cover 720.

In another embodiment, flexible membrane 740 is used by itself or is molded or bonded to the cover 720 with valve body 730 bonded or molded to it.

Depending on the embodiment, the vertical position of the valve body is defined either by presence or absence of the external force. In one position, the valve forms a passage from the fluidic channel 750 though the valve cavity underneath the valve cover 740 to other portions of the fluidic channel. In another position, it seals the opening preventing fluid propagation from one part of the channel to another.

In one embodiment of the valve, the actuator applies up or down force on the valve body 730 or flexible cover 720. In another embodiment, force applied in one direction and flexible membrane, or cover apply force on the valve body in other direction. In either case the valve is fully controlled and can be opened and closed repeatedly.

Figure 7B:
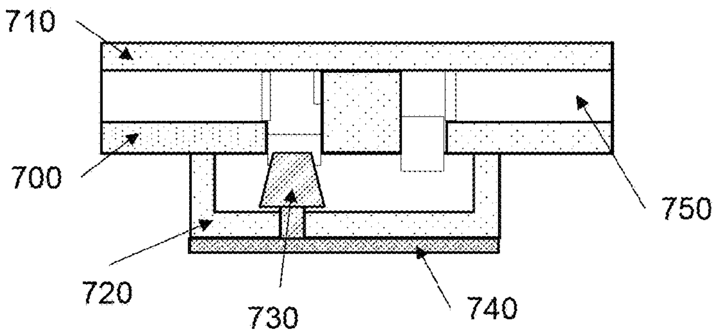

FIG. 7B shows another preferred embodiment. In this case, the valve cover is bonded to the bottom plate 700 of the cartridge allowing actuators located on the centrifuge rotor to apply force.

Figure 8:
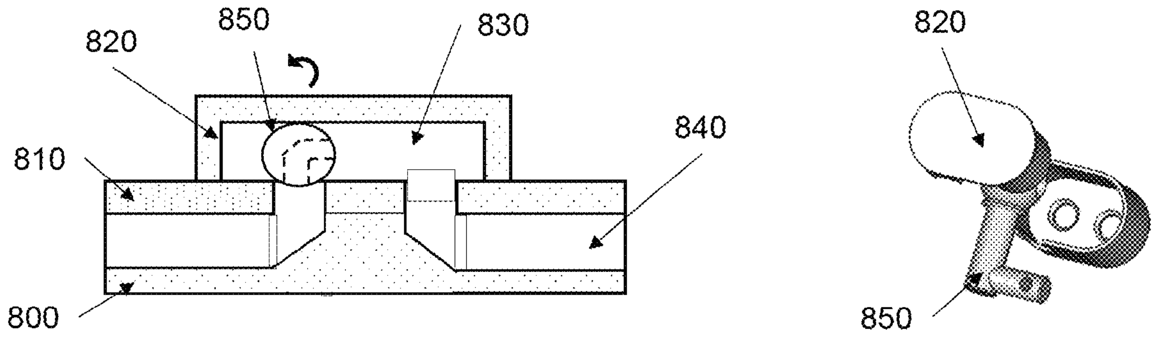

As shown in FIG. 8, the opening and closing of the fluid path is controlled by rotating valve body 850 aligning the channel inside the valve body with an opening 830 under valve cover 820, creating a fluidic path from one part of the channel 840 under the valve cover 820, through the valve body 850 to another part other fluidic channel. Rotating the valve body in the opposite direction interrupts the flow. To make sure that in a closed position, the valve is sealing the channel opening, a ball shaped valve body 850 is pressed into channel opening by valve cover 820 during the assembly process. A tight seal is ensured by using a pliant material, such as polypropylene, for the top cover 810. The top cover 810 is deformed by the valve body 850, which preferably is made from harder material like polycarbonate.

The valve 130 in FIG. 1 is configured to be actuated by physical or magnetic force. In so doing, the valve may be opened or closed by the actuating force. As the valve is opened or closed, flow through at least one of the plurality of channels will be affected. Accordingly, by controlling the actuation of the valve 130, flow through the plurality of channels is controlled.

In some embodiments, the valve 130 is magnetized and the valve is configured to be actuated by an electromagnet, combination of electromagnet and permanent magnet or the motion of a permanent magnet. In some embodiments, the valve is configured to be actuated by physical force. In some embodiments, the physical force which actuates the valve is centrifugal force. In some embodiments, the physical force which actuates the valve is applied directly to the valve by an actuator.

In some embodiments, the valve 130 may be installed along a channel to control flow through the channel. In some embodiments, the valve 130 may be installed at the intersection of two or more channels to control the direction of flow through various outlets. In some embodiments, the valve 130 is selected from the group consisting of a globe-type valves, a gate valve, a butterfly valve, a diaphragm, a ball valve, and a pinch valve. In some embodiments, the valve 130 is an L-port ball valve. In some embodiments, the valve 130 is reversible. Accordingly, the valve 130 may be opened and later closed, or closed and later opened.

Fluidic operation of cartridge 100 shown on FIG. 1 to separate blood consists of multiple steps. The sequence of steps may be modified to optimize and to accommodate user needs and workflow. A preferred sequence of steps is described.

After reservoirs 110, 140, 160 150 and 170 are filled with wash fluid, sample, density gradient media and storage media respectively, and the cartridge is placed and secured in the centrifuge, all valves are initialized by the centrifuge to normally open or normally closed positions prior to start of centrifugation. In one embodiment, all the valves are set to closed, except the valve between reservoirs 160 and 191 and between 110 and 140. Centrifuge actuators are driven during initialization process to ensure that normally closed valves will seal the appropriate channels. To prevent premature motion of the fluids throughout the cartridge, during cartridge filling, handling and prior centrifuge actuators initialization, passive capillary stop valves 194 are employed at required locations. After reservoir 140 is filled and valve actuators are initialized, the valve between reservoirs 110 and 140 is closed. In this embodiment, reservoirs 110 and 140 are in series to simplify the user experience. Both reservoirs are filled from a single opening 120. The other embodiments may employ parallel arrangements of reservoirs 110 and 140.

After the start of centrifugation, the blood sample is driven into reservoir 191 where blood cells are driven to the outer section of the reservoir (from the center of rotation), while plasma is located closer to the center of rotation. After sufficient separation time, the valve between reservoirs 191 and 192 is opened and plasma is distributed into collection reservoirs 192. After plasma is placed into collection reservoir 192, valve between reservoirs 191 and 192 is closed to section off clean plasma. In FIG. 1, the top of the cassette is closer to the center of rotation. The bottom is located farther away from the center of rotation. Consequently, centrifugal forces at the top of the cassette are less than at the bottom.

In the next step of the fluidic operation, the valve between density gradient media (Ficoll®, or any other) storage reservoir 150 and 191 is open. Ficoll is driven underneath the cell layer in reservoir 191, lifting cells back into reservoir 160 where cells start to separate by density. PBMC with platelets (less denser cells) will rise to the top of the layer, while RBC flows down, driven by the centrifugal force to settle back in the bottom of reservoir 191. After reservoir 150 is emptied, the valve between reservoirs 150 and 191 is closed.

The completion of the separation process in some embodiments is controlled by separation time and rotational speed. In other embodiments, the centrifuge's microcontroller monitors the process by using sensors such as sensors 350, 360 or 370 shown on FIG. 3 and moves process to the next step by following a programable logic.

In the next step, the valve between reservoirs 160 and 191 is closed, separating PBMC and platelets suspended in Ficoll® from RBC. The next few steps in the separation process are washes. During the first wash, the valve between reservoirs 140 and 160 is open to allow wash to dilute Ficoll®/PBMC mixture in reservoir 160. After some time under centrifugation forces, PBMC will be driven down and settle in the bottom portion of reservoir 160 below waste drain lines. Then, the valve between reservoirs 180 and 160 is opened to drain wash/Ficoll® mixture to waste reservoir 180. After wash/Ficoll® fills reservoir 180, the valve between reservoirs 160 and 180 is closed.
The wash process is then repeated utilizing wash fluid from reservoir 110 and emptying it into reservoir 190, leaving cleaned PBMC settled in the bottom of reservoir 160. In some embodiments, an alternative wash solution using lysis buffer is introduced to further clean the PMBCs of red blood cells.

The blood separation process is finalized by suspending PBMC in storage media when the valve between reservoirs 170 and 160 is open and storage media resuspends PBMC inside reservoir 160. The valve between reservoirs 160 and 170 is closed and the valve between reservoirs 160 and 193 is open, allowing PBMC in storage media to be driven by centrifugal force to reservoir 193. After completion of that step, the valve between reservoirs 160 and 193 is closed sealing cleaned PBMC in the storage media inside PBMC collection reservoir 192. In some cases, blood samples will have different hematocrit content. For example, neonatal or anemic patient samples have very different volumes of RBC.

Figure 3:
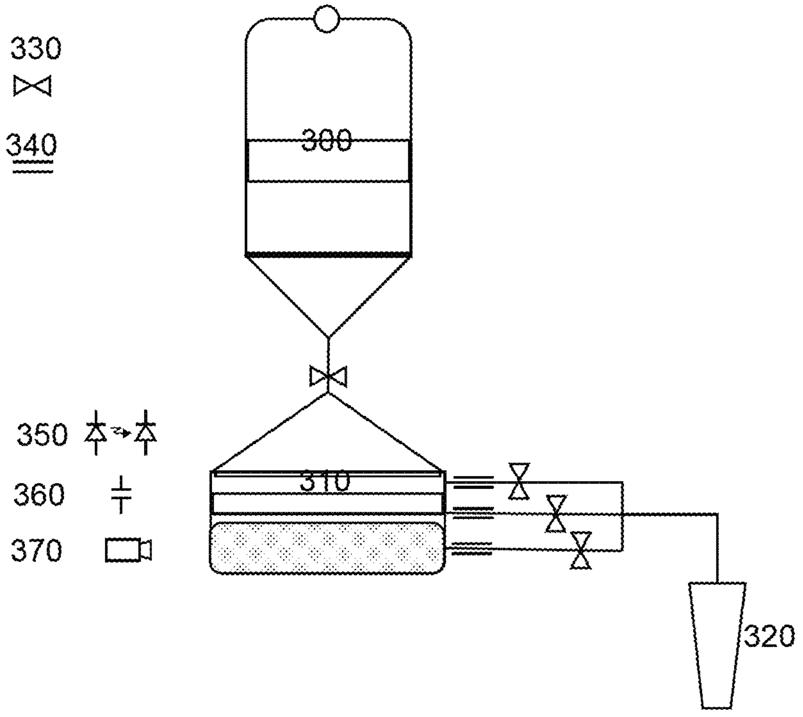
FIG. 3 Shows method of separating samples with different hematocrit levels.

FIG. 3 shows a preferred method of facilitating efficient separation in certain cases, such as those with different hematocrit (e.g., samples from neonatal or anemic individuals). Separation region 310 in that case might have more than one outlet channel connected to the plasma collection reservoir through an actively controlled valve. To automatically recognize the appropriate volume of RBC in the sample and activate appropriate path to the collector reservoir 320 one would wait for separation step of plasma from other constituents in the separation chamber 310 to be complete, then measure level of plasma or cells with sensor housed on the centrifuge rotor, cartridge itself or near cartridge reservoir 310 in the centrifuge. Sensors employed in this task could be either optical 350 (measuring absorbance or reflectance), capacitive 360, or imaging 370. Information collected by the sensor transferred to microprocessor for analysis. Upon completion microprocessor activates appropriate valve for one of the parallel channels, making sure that plasma is transferred to collector reservoir, while other cells are left in 310 for further separation.

Figure 2:
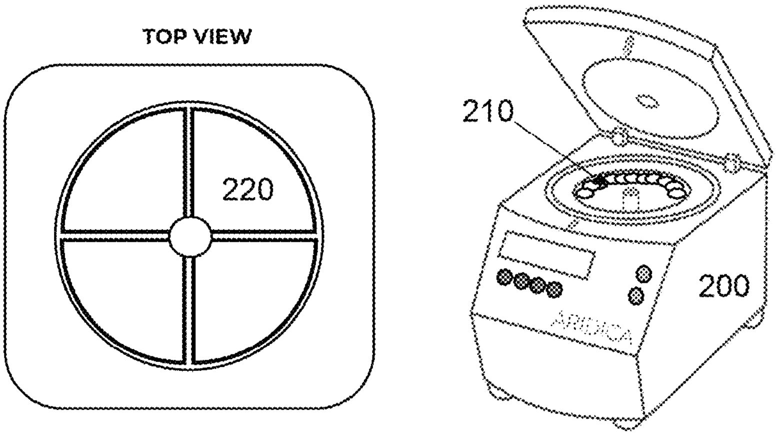
FIG. 2 shows arrangement of cartridges in the centrifuge

Referring to FIG. 2, a peripheral blood mononuclear cell (PBMC) separation workflow is exemplified. The description below generally refers to a cartridge containing a blood sample. While the cartridge 100 described above is believed to be appropriate for use in the system 200 described below, the inventors equally conceive that other cartridges may be used by the disclosed system 200.

The PBMC separation system comprises a microfluidic cartridge 220 configured to process a blood sample as described above. The cartridge 220 is inserted in a centrifuge 200 and placed on rotor 210. In some embodiments, multiple cartridges are used simultaneously with different sample to increase systems throughput or with same sample to increase output volume.

Figure 4:
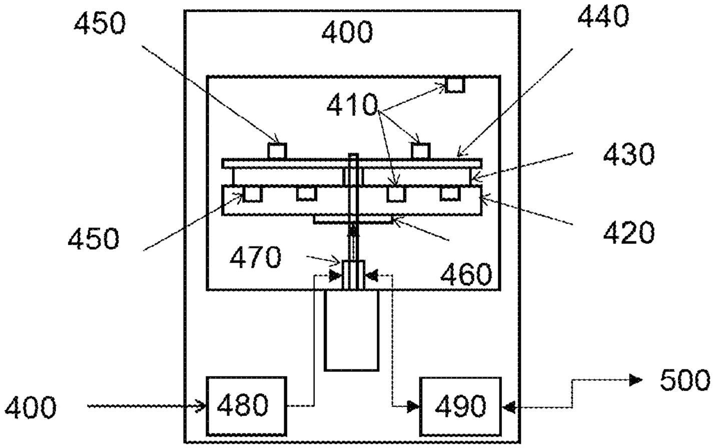
FIG. 4 Shows a cross-sectional schematic of a centrifuge for use in the invention.
Figure 5:
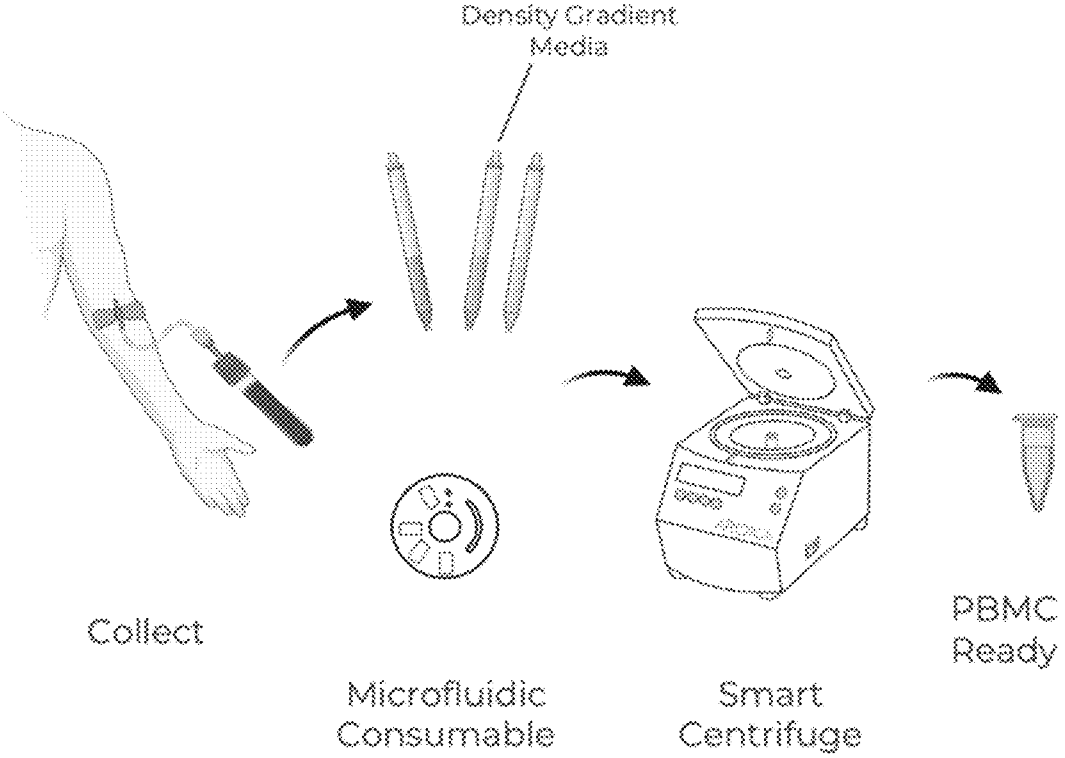
FIG. 5 Shows workflow process according to the proposed invention

FIG. 4 depicts one of the embodiments of separation systems that comprises the centrifuge 400 and one or more separation cartridge 430 that is positioned on the rotating centrifuge rotor 420. In some embodiment, cartridge 430 is fixed to the rotor 420 with hardware. In some embodiments, the cartridge is sandwiched between rotor 420 and top plate 440 to ensure cartridge stability during rotation. In that embodiment top plate 440 is fixed to the rotor during rotation.

The PBMC separation system may also comprise of one or more actuators 450 configured to interface with the cartridge and operate one or more valve on the cartridge by physical or magnetic force. In some embodiments, the actuator is operated (and therefore moving the valve) during rotation of the cartridge. In some embodiments, the actuator is operated while the cartridge is stationary. In some embodiments, actuators are mounted on the rotor 420 and in some embodiments, actuators are mounted on the top plate 440 or a combination of both.

The separation system optionally comprises one or more sensors 410 mounted on the centrifuge. Alternatively, in some embodiments, the sensor is mounted on the rotor or top plate or combination. Generally, the sensor is configured to monitor the cartridge. The sensor 410 may be any sensor that provides feedback on the cartridge or the processes therein to the controller 490 or 460. In some embodiments, the sensor monitors separation of the blood sample and isolation of the separated portion of PBMCs. In some embodiments, the sensor is selected from the group consisting of capacitive, magnetic, mechanical, thermal and optical sensing.

Finally, a system of the invention preferably comprises a controller 490 or 460. The controller is connected to the centrifuge and configured to control operation of the rotor and cartridge valves (via the actuator) to isolate a separated portion of PBMCs. In some embodiments, the controller is configured to control operation of the centrifuge and the valve based on feedback received from the sensor. In other embodiments, the controller is configured to cause the separation system to perform the method disclosed below. In some embodiments, the controller is configured to cause the separation system to perform one or more of the following: (1) detect loading of a cartridge into the system; (2) detect the presence of a blood sample within the cartridge; (3) rotate the cartridge at a predetermined rate; (4) apply physical of magnetic force to a valve on the cartridge; (5) detect separation of the blood sample; or (6) detect isolation of a PBMC fraction of a blood sample.

In some embodiments, the controller is configured to monitor any or all of run-time quality, purity of the separated portion of PBMCs, consistency of the separated portion of PBMCs, percent recovery, and/or viability of the separated portion of PBMCs as compared to a blood sample. In some embodiments, the controller is configured to perform these functions based on feedback from the sensor. In some embodiments, the controller is configured to perform these functions for multiple samples over time, thereby monitoring the output from the system over time. In some embodiments, the information collected by the sensors is used for further optimization of the separation cycle. In another embodiment, it is used for online or offline processing like performance dashboards, quality metrics.

In some embodiments, as shown in FIG. 4, controller 490 is located on a stationary portion of the centrifuge. In some embodiments, the controller controls operation of the actuator by pneumatics or by wireless communication.

In some embodiments the microcontroller 460 may be a sub-controller connected to the controller 490 and other elements of the top plate or the rotor and configured to: operate actuators connected thereto; receive input from sensors connected thereto; transmit input from sensors connected thereto to the controller; and/or receive commands from the controller.

In a preferred embodiment, the controller, sensors and/or actuators are powered by a mechanical connection, such as a slip ring. As a non-limiting example, the centrifuge comprises a power supply that converts 120/240V alternating current (AC) to a specified direct current (DC) as required by the centrifuge. The current is supplied via the slip ring to the spinning rotor. Alternatively, power can be supplied inductively by conversion of AC to DC and then to high-frequency AC via a power source attached to or integrated in the centrifuge. The high-frequency AC current travels through a transmitter coil to generate an alternating magnetic field that couples to a receiving coil that generates AC that is then converted to DC by an AC/DC converter (preferably located on the rotor PCB). A small, controlled gap between the coils ensures high magnetic coupling efficiency. Finally, power may be transferred in some embodiments via capacitive power transfer, which is similar to inductive transfer but instead of using a transmitter coil, a capacitor (e.g., formed via two parallel plates) is used. Charging and discharging of the capacitor facilitates power transfer to the rotor.

In preferred embodiments, the invention comprises separating a blood sample to isolate a PBMC fraction. Preferred methods comprise loading a blood sample into an inlet region of a cartridge, which is rotated. In so doing, a centrifugal force is applied to the blood sample. In some embodiments, the rate of rotation is varied during the method.

Preferred methods further comprise opening or closing a valve of the cartridge to modify an internal flow path of the cartridge. The valve is opened or closed by applying physical or magnetic force to the valve. In some embodiments, the force is applied while the cartridge is being rotated. In some embodiments, the force is applied to the valve before or after the cartridge is rotated.

In some embodiments, methods further comprise monitoring the separation through a sensor to obtain feedback regarding run time quality, purity, consistency, percent recovery, or viability of the separated portion of PBMCs as compared to the blood sample. In some embodiments, feedback is compiled over multiple runs.

In some embodiments, preferred methods comprise further separating the PBMC fraction into one or more of: T cells, B cells, NK cells, macrophages, or dendritic cells. In some embodiments, the further separation is performed by applying antibody coupled magnets to the PBMC fraction.

Methods of the invention preferably are automated. For example, a user may load the blood sample and execute a program that rotates the cartridge and opens/closes valves under control of a microprocessor to provide an isolated PBMC fraction.

What is claimed is:

1. A fluidic cartridge for separation of blood by rotational force, the fluidic cartridge comprising:

an inlet region comprising a sample reservoir having an opening adapted to receive a blood sample;

a separation region comprising a separation reservoir and a density gradient media reservoir comprising a medium for separation of blood components upon application of rotational force;

a collection region;

a plurality of channels connecting the inlet region, the separation region, and the collection region and connecting the density gradient media reservoir to the separation reservoir; and a plurality of valves wherein a valve of the plurality of valves is on each channel of the plurality of channels, wherein each valve of the plurality of valves comprises an empty valve cavity and a valve cover, said valve cover bonded to a bottom portion of the fluidic cartridge that is adhered to a top portion of the fluidic cartridge, said valve cover having a rigid portion and a flexible portion that forms a continuous seal beneath the valve cavity, wherein the bottom portion of the fluidic cartridge has two bottom portion openings at each valve to form a passage from a fluidic channel through the valve cavity when the valve is in an open position, wherein the valve is configured to be opened and closed repeatedly, and wherein the valve is not a wax valve.

2. The fluidic cartridge of claim 1, wherein the plurality of channels comprise a hydrophilic or hydrophobic coating.

3. The fluidic cartridge of claim 1, wherein the plurality of channels is coated with heparin or other anticoagulant substance.

4. The fluidic cartridge of claim 1, wherein the flexible portion is a flexible membrane.

5. The fluidic cartridge of claim 1, wherein the fluidic cartridge further comprises a wash reservoir, a storage media reservoir, and a waste collection reservoir, wherein the wash reservoir, the storage media reservoir, and the waste collection reservoir are connected to the sample reservoir by the plurality of channels.

6. The fluidic cartridge of claim 1, wherein the collection region comprises a plasma collection reservoir and a PBMC collection reservoir.

7. The fluidic cartridge of claim 6, wherein the plurality of channels connect the plasma collection reservoir to the separation reservoir and connects the PBMC collection reservoir to the sample reservoir.

8. The fluidic cartridge of claim 1, wherein the plurality of channels connect the density gradient media reservoir to the separation reservoir at a branched section that is connected to the outer edge of the separation reservoir.

9. The fluidic cartridge of claim 1, wherein the plurality of channels connect the outer edge of the sample reservoir to the inner edge of the separation reservoir.

10. The fluidic cartridge of claim 1, wherein the fluidic cartridge comprises a plurality of capillary stop valves connected to the plurality of channels to prevent fluidic movement through the fluidic cartridge without centrifugal force.

11. The fluidic cartridge of claim 1, wherein the valve on each of the plurality of channels further comprises a valve body inside the valve cavity molded to the flexible portion of the valve cover.

12. A fluidic cartridge for separation of blood by rotational force, the fluidic cartridge comprising:

an inlet region comprising a wash reservoir and a sample reservoir having an opening adapted to receive a blood sample;

a separation region comprising a separation reservoir and a density gradient media reservoir comprising a medium for separation of blood components upon application of rotational force;

a collection region comprising a plasma collection reservoir, and a PBMC collection reservoir;

a plurality of channels connecting the sample reservoir, the plasma collection reservoir, and the density gradient media reservoir to the separation reservoir, and connecting the PBMC collection reservoir, the wash reservoir, a storage media reservoir, and a waste collection reservoir to the sample reservoir; and a plurality of valves wherein a valve of the plurality of valves is on each channel of the plurality of channels, wherein each valve of the plurality of valves comprises an empty valve cavity and a valve cover, said valve cover bonded to a top portion of the fluidic cartridge that is adhered to a bottom portion of the fluidic cartridge, said valve cover having a rigid portion and a flexible portion that forms a continuous seal above the valve cavity, wherein the top portion of the fluidic cartridge has two top portion openings at each valve to form a passage from a fluidic channel through the valve cavity when the valve is in an open position, wherein the valve is configured to be opened and closed repeatedly, and wherein the valve is not a wax valve.

13. The fluidic cartridge of claim 12, wherein the flexible portion is a flexible membrane.

14. The fluidic cartridge of claim 12, wherein the plurality of channels connect the density gradient media reservoir to the separation reservoir at a branched section that is connected to the outer edge of the separation reservoir.

15. The fluidic cartridge of claim 12, wherein the plurality of channels connect the outer edge of the sample reservoir to the inner edge of the separation reservoir.

16. The fluidic cartridge of claim 12, wherein the fluidic cartridge comprises a plurality of capillary stop valves connected to the plurality of channels to prevent fluidic movement through the fluidic cartridge without centrifugal force.

17. The fluidic cartridge of claim 12, wherein the valve on each of the plurality of channels further comprises a valve body inside the valve cavity molded to the flexible portion of the valve cover.

18. A fluidic cartridge for separation of blood by rotational force, the fluidic cartridge comprising:

an inlet region comprising a wash reservoir and a sample reservoir having an opening adapted to receive a blood sample;

a separation region comprising a separation reservoir and a density gradient media reservoir comprising a medium for separation of blood components upon application of rotational force;

a collection region comprising a plasma collection reservoir, and a PBMC collection reservoir;

a plurality of channels connecting the plasma collection reservoir and the density gradient media reservoir to the separation reservoir, connecting the PBMC collection reservoir, the wash reservoir, a storage media reservoir, and a waste collection reservoir to the sample reservoir, and connecting the outer edge of the sample reservoir to the inner edge of the separation reservoir; and a plurality of valves wherein a valve of the plurality of valves is on each channel of the plurality of channels, wherein each valve of the plurality of valves comprises an empty valve cavity and a valve cover, said valve cover bonded to a bottom portion of the fluidic cartridge that is adhered to a top portion of the fluidic cartridge, said valve cover having a rigid portion and a flexible portion comprising a flexible membrane that forms a continuous seal beneath the valve cavity, wherein the bottom portion of the fluidic cartridge has two bottom portion openings at each valve to form a passage from a fluidic channel through the valve cavity when the valve is in an open position, wherein the valve is configured to be opened and closed repeatedly, wherein the valve is not a wax valve, and wherein the fluidic cartridge comprises a plurality of capillary stop valves connected to the plurality of channels to prevent fluidic movement through the fluidic cartridge without centrifugal force.

19. The fluidic cartridge of claim 18, wherein the plurality of channels connect the density gradient media reservoir to the separation reservoir at a section that is connected to the outer edge of the separation reservoir.

20. The fluidic cartridge of claim 18, wherein the valve on each of the plurality of channels further comprises a valve body inside the valve cavity molded to the flexible portion of the valve cover.

* * * * *